US011206510B2

(12) United States Patent
Kolde et al.

(10) Patent No.: US 11,206,510 B2
(45) Date of Patent: Dec. 21, 2021

(54) WIRELESS DEVICE INFORMATION SYSTEMS AND METHODS

(71) Applicant: Intel IP Corporation, Santa Clara, CA (US)

(72) Inventors: Martin Kolde, Neubiberg (DE); Thorsten Clevorn, Munich (DE)

(73) Assignee: Intel Corporation, Santa Clara, CA (US)

( * ) Notice: Subject to any disclaimer, the term of this patent is extended or adjusted under 35 U.S.C. 154(b) by 2 days.

(21) Appl. No.: 16/486,344

(22) PCT Filed: Mar. 31, 2017

(86) PCT No.: PCT/US2017/025481
§ 371 (c)(1),
(2) Date: Aug. 15, 2019

(87) PCT Pub. No.: WO2018/182708
PCT Pub. Date: Oct. 4, 2018

(65) Prior Publication Data
US 2020/0314600 A1 Oct. 1, 2020

(51) Int. Cl.
*H04W 4/06* (2009.01)
*H04W 4/40* (2018.01)
(Continued)

(52) U.S. Cl.
CPC .............. *H04W 4/06* (2013.01); *G08G 1/091* (2013.01); *H04W 4/02* (2013.01); *H04W 4/40* (2018.02); *H04W 24/08* (2013.01); *H04W 88/10* (2013.01)

(58) Field of Classification Search
CPC ....... H04W 4/06; H04W 24/08; H04W 88/10; H04W 4/40; H04W 4/02; G08G 1/091
See application file for complete search history.

(56) References Cited

U.S. PATENT DOCUMENTS 10,834,751 B2 * 11/2020 Yi ..................... H04W 72/0446
2016/0212596 A1 * 7/2016 Brahmi ............... H04W 72/042
(Continued)

FOREIGN PATENT DOCUMENTS

WO WO-2017/033486 A1 3/2017
WO WO-2017/052488 A1 3/2017

OTHER PUBLICATIONS

Choi, et al., "Millimeter Wave Vehicular Communication to Support Massive Automotive Sensing", 11 pgs., dated May 18, 2016.
(Continued)

*Primary Examiner* — Muthuswamy G Manoharan
(74) *Attorney, Agent, or Firm* — Schiff Hardin LLP (57) ABSTRACT

A communication device adapted for communicating in a communication system can include a receiver, a processor, and a transmitter. The receiver can receive (e.g., capture, sniff) information from one or more wireless devices (e.g., vehicles) using a first communication technology (e.g., V2X technologies). The processor can process the received information to generate system information associated with the communication system. The transmitter can transmit the system information to one or more wireless devices using a second communication technology (e.g., LTE) different from the first communication technology.

27 Claims, 5 Drawing Sheets

(51) Int. Cl.
*H04W 4/02* (2018.01)
*H04W 24/08* (2009.01)
*H04W 88/10* (2009.01)
*G08G 1/09* (2006.01)

(56) References Cited

U.S. PATENT DOCUMENTS

| | | |
|---|---|---|
| 2016/0294512 A1 | 10/2016 | Noh et al. |
| 2017/0006140 A1 | 1/2017 | Park et al. |
| 2018/0234913 A1* | 8/2018 | Kahtava ............ H04W 36/0069 |
| 2018/0359707 A1* | 12/2018 | Chae .................. H04W 52/383 |

OTHER PUBLICATIONS

Manolakis, et al., "Time Synchronization for Multi-Link D2D/V2X Communication", IEEE 84th Vehicular Technology Conference, 6 pgs., Sep. 2016.
PCT International Search Report issued for PCT/US2017/025481, 1 pg., dated Jun. 16, 2017.

* cited by examiner

WIRELESS DEVICE INFORMATION SYSTEMS AND METHODS

BACKGROUND

Field

Aspects described herein generally relate to information systems and methods for wireless communications, including exchanging and analyzing information of wireless devices.

Related Art

The automotive industry is undergoing technological transformations as vehicles become more connected to the Internet and to each other. In order to deal with increasingly complex road situations, automated vehicles need to rely not only on their own sensors, but also information communicated from other automated vehicles.

Vehicle-to-Everything (V2X) communication is the passing of information from a vehicle to any entity that may affect the vehicle, and vice versa. V2X is a vehicular communication system that incorporates other more specific types of communication, such as Vehicle-to-Infrastructure (V2I), Vehicle-to-Vehicle (V2V), Vehicle-to-Device (V2D), Vehicle-to-Pedestrian (V2P), Vehicle-to-grid (V2G), etc. V2X can include cellular V2X (C-V2X), which includes the more specific types of communication above and can include vehicle-to-network (V2N) communications (e.g., via one or more cellular technologies). V2X is used as an example type of communication for purposes of explanation, but the disclosure is not limited in this respect.

Example types of technologies that support V2X communications include: Dedicated Short Range Communications (DSRC), V2V (e.g. cellular V2V (C-V2V)), device-to-device (D2D) communications, and one or more cellular technologies. DSRC is a standard protocol for vehicular communication, and can include wireless access in vehicular environments (WAVE) as defined in Institute of Electrical and Electronics Engineers' (IEEE) 802.11p, which uses the 5.9 GHz band (e.g., 5.85-5.925 GHz; Band 47). Regarding cellular technologies, 3rd Generation Partnership Project (3GPP) Long Term Evolution (LTE) V2V/V2X is a candidate for 5th Generation (5G) wireless systems. DSRC and 3GPP LTE V2V/V2X differ substantially. For example, spectrum access is managed differently, that is, DSRC uses contention based access, whereas 3GPP LTE V2V/V2X manages scheduling based on efficient use of resources. At the same time, 3GPP has introduced standard enhancements to support Internet of Things (IoT) applications, which extend cellular coverage using data connections with the network in remote and poor network access areas, such as underground parking, rural areas, and cell edges.

V2X, including DSRC, V2V (e.g., C-V2V), and D2D, and cellular technologies face deployment challenges. DSRC, V2V, D2D, etc. have limited communication range (e.g., 150 m-300 m), and cellular coverage is not always available (rural areas, underground, tunnel, loaded cell). Therefore, a single technology is not sufficient to support a variety of expected V2X applications for a large number of vehicles. In such a dynamic environment, V2X communication and autonomous driving can utilize the gathering and exchange of information between the DSRC, V2V, D2D and cellular environments.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

The present disclosure is directed to wireless communication systems and methods for sharing information about wireless devices, including exchanging and analyzing information of the wireless devices configured for device-to-device (D2D) communications or other machine-to-machine or vehicle-to-vehicle, or machine-to-vehicle communications.

While this disclosure is described with respect to V2X (and particularly V2V) technologies, it is understood that the disclosure is not limited in this respect. The concepts described herein may be applicable to technologies such as, for example (but not limited to), 3rd Generation Partnership Project (3GPP) Long Term Evolution (LTE), 5th Generation (5G) wireless systems, Bluetooth, Wi-Fi, Vehicle-to-Everything (V2X), Vehicle-to-Infrastructure (V2I), Vehicle-to-Vehicle (V2V), Vehicle-to-Device (V2D), Multefire, Cellular Broadband Radio Service (CBRS), ZigBee, Z-Wave, Narrow Band Internet-of-Things (NB-IoT), etc.

The concepts described herein may also be applicable in enterprise settings, industrial settings (e.g., robot-to-robot), aviation settings (e.g., plane-to-plane, drone-to-drone), smart building settings (e.g., smart-home systems), device-to-device settings (e.g., mobile device to mobile device communications), and to technologies having both contention and non-contention based protocols, such as 5G and Wi-Fi.

Figure 1A:
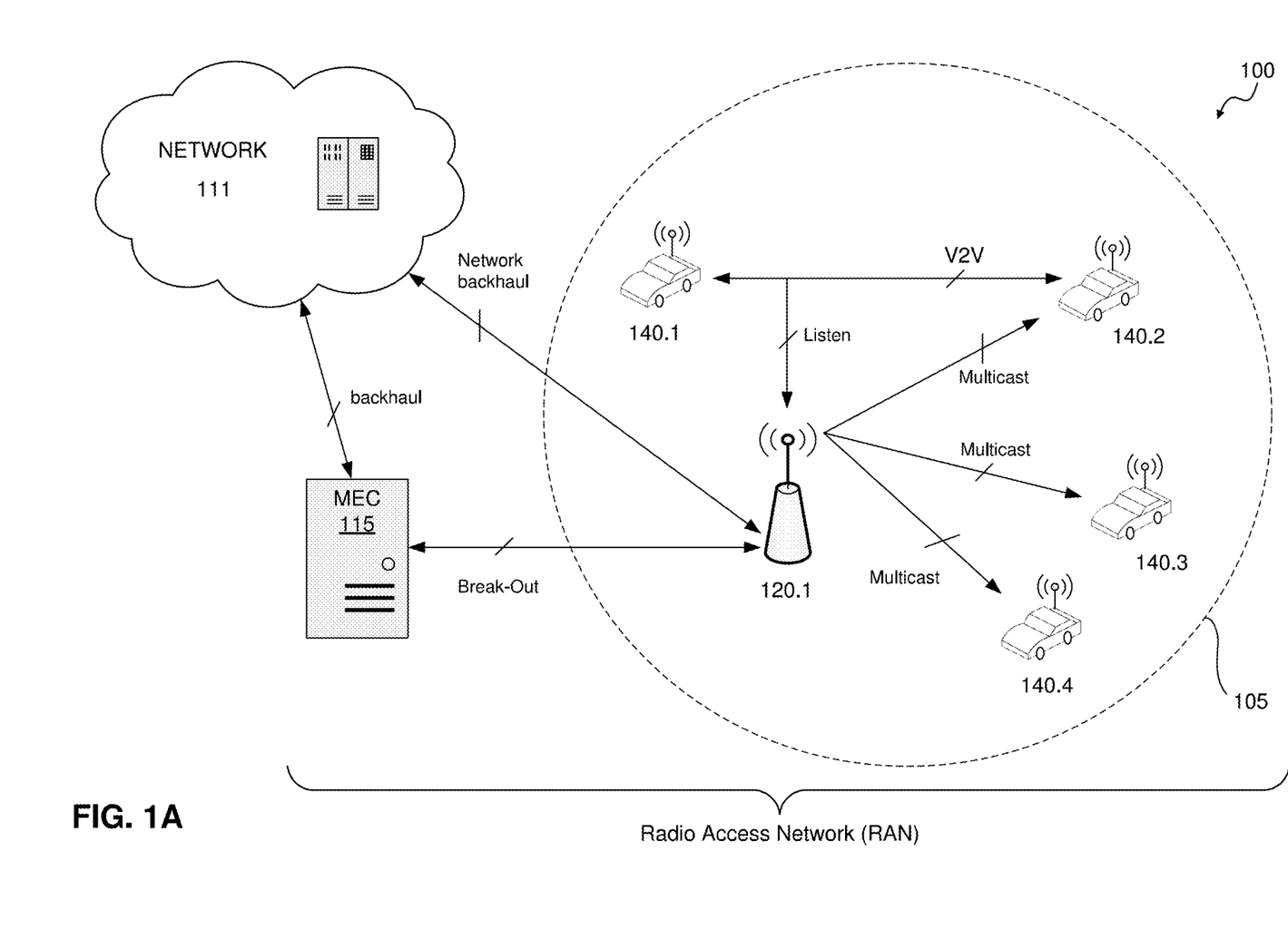
FIG. 1A illustrates a wireless communication system according to one exemplary aspects of the present disclosure.

FIG. 1A illustrates a wireless communication system 100 according to exemplary aspects of the present disclosure. The wireless communication system 100 includes a radio access network (RAN) and a core network 111. The RAN includes one or more base stations 120, one or more mobile edge computers (MECs) 115, and one or more wireless communication devices 140. The base station(s) 120 can be communicatively coupled to the network 111 via one or more MECs 115. The base station(s) 120 can additionally or alternatively be connected to the network 111 via a network backhaul path. The network backhaul path (and/or the backhaul path from the MEC 115) can include, for example, an evolved packet core (e.g., serving gateway, MME, HSS, etc.) in one or more aspects. In aspects, each base station 120 has a corresponding MEC 115, or two or more base stations 120 can share a MEC 115. Although FIG. 1A shows the MEC 115 being separate from base station 120 and communicatively coupled to the base station 120 via the breakout communication path, the MEC 115 can be included within the base station 120 in one or more exemplary aspects. In an exemplary aspect, the MEC 115 and one or more processors of the base station 120 can cooperatively perform processing operations. For example, the processor(s) of the base station 120 can process more time-sensitive information (e.g., when the MEC is externally located). Base station 120 may be, for example, an eNodeB, a small cell, a femto cell, a pico cell, a micro cell, a road side unit, or other infrastructure devices capable of wireless communications.

In an exemplary aspect, the network 111 can include one or more well-known communication components—such as one or more network switches, one or more network gateways, and/or one or more servers. The network 111 can include one or more devices and/or components configured to exchange data with one or more other devices and/or components via one or more wired and/or wireless communications protocols. In exemplary aspects, the base stations 120 communicate with one or more service providers and/or one or more other base stations 120 via the network 111. In an exemplary aspect, the network 111 is an internet protocol (IP) backhaul network, such as the Internet. In an exemplary aspect, the network 111 includes one or more components of an evolved packet core.

The number of MECs 115, base stations 120, wireless communication devices 140, and/or networks 111 are not limited to the exemplary quantities illustrated in FIG. 1A, and the wireless communication system 100 can include any number of the various components as would be understood by one of ordinary skill in the relevant art(s).

The communication device 140 and the base station 120 can each include a transceiver configured to transmit and/or receive wireless communications via one or more wireless technologies within the communication environment 100. In operation, the communication devices 140 can be configured to communicate with the base station 120 in a serving cell or sector 105 of the communication environment 100 and/or with one or more other devices 140.

In an exemplary aspect, wireless communication system 100 is a Vehicle-to-Everything (V2X) system and the wireless communication device(s) 140 are vehicles (e.g., automobiles) configured to communicate with one or more other vehicles 140 using one or more V2X communication technologies. Additionally or alternatively, one or more communication devices 140 can be implemented in corresponding automobiles such that the vehicles are configured to wirelessly communicate with one or more base stations 120 and/or one or more other communication devices 140, such as one or more other vehicles configured for wireless communication, in a V2X (e.g., V2V) system. In this example, the vehicles having communication device(s) 140 implemented therein can be referred to as vehicles 140.

While exemplary aspects are described with respect to V2X and/or V2V systems, it is understood by those of ordinary skill in the art that the disclosure is not limited in this respect. For example, the concepts described herein may also be applicable in enterprise settings, industrial settings (e.g., robot-to-robot), aviation settings (e.g., plane-to-plane, drone-to-drone), smart building settings (e.g., smart-home systems), device-to-device settings (e.g., mobile device to mobile device communications), other D2D systems, and to technologies having both contention and non-contention based protocols, such as 5G and Wi-Fi.

Further, examples of the wireless communication devices 140 include (but are not limited to): wireless devices configured for wireless communication via one or more wireless technologies; vehicles (e.g., automobiles, nautical vessels, aircraft, motorcycles, bicycles, etc.) configured for wireless communication, such as vehicles that include one or more wireless communication receivers and/or wireless communication receivers transmitters, and/or automotive/aeronautical/maritime in-dash computer terminals; a mobile device—such as a laptop computer, a tablet computer, a mobile telephone or smartphone, a "phablet," a personal digital assistant (PDA), and mobile media player; and a wearable computing device—such as a computerized wrist watch or "smart" watch, and computerized eyeglasses, Internet of Things (IoT) devices—such as a smart home/building devices (e.g., sensors, cameras, lighting, switches, outlets, voice-capable assistants, thermostats, appliances, etc.); robotics; and drones.

In an exemplary aspect, the vehicles 140 are configured to wireless communicate with one or more other vehicles 140 using Vehicle-to-Vehicle technologies (V2V) (e.g., WAVE, 5.9 GHz, 2.4 GHz, 700 MHz), such as illustrated by the V2V communication between vehicles 140.1 and 140.2. The vehicles 140 can additionally or alternatively be configured to communication with one or more other wireless devices using Vehicle-to-Everything technologies (V2X), such as with, for example, one or more traffic, navigational, weather, and/or emergency services devices. The vehicles 140 can additionally or alternatively be configured to communicate with one or more base stations 120 using one or cellular communication technologies (e.g., LTE), such as shown by the multicast communication between the base station 120 and vehicles 140.2-140.4.

In an exemplary aspect, the base station 120.1 is configured to wirelessly capture (e.g., listen, sniff) information that is wirelessly transmitted by the vehicle(s) 140 using one or more V2X (e.g., V2V) technologies. For example, the base station 120.1 can capture (via the listen/capture path) the information exchanged between the vehicles 140.1 and 140.2 via the V2V communication path using one or more V2X technologies. In an exemplary aspect, the base station 120 includes one or more antennas that have a higher sensitivity than antennas of the vehicles 140 used for V2X technologies. Therefore, the base station 120 can capture information wireless transmitted by the vehicles 140 at a greater range than typically achieved for V2X and/or V2V communications between vehicles 140 or other objects themselves. The base station 120 can be, for example, an eNodeB, a macrocell, a microcell, a wireless access point, a roadside unit, roadside cell, a femtocell, and/or another wireless transmitting and/or receiving device as would be understood by one of ordinary skill in the relevant arts.

In an exemplary aspect, the base station 120.1 can be configured to perform one or more sniffing/capturing operations to sniff/capture the information or a portion of the information transmitted by the vehicle 140.1 to the vehicle 140.2, and vice versa, using one or more V2X technologies. In some aspects, the vehicles 140 can be configured to transmit information to the environment without having an identified receiving device (e.g., a broadcast, such as a periodic, repeated, or otherwise scheduled broadcast). In this example, the base station 120.1 can be configured to capture information associated with these transmissions.

The captured information can then be processed by the base station 120 and/or the MEC 115. For example, the base station 120.1, the MEC 115, or the base station 120.1 cooperatively with the MEC 115, can process the captured information to generate system information associated with the communication system 100. The processing can include deep learning processing, cloud computing processing, or the like. In an exemplary aspect, the processing can include obtaining additional information from one or more external sources and combining a portion or all of the external information with the captured information to generate the system information. For example, the external information can be obtained by the MEC 115 from one or more components of or connected to the network 111 via the backhaul connection between the network 111 and the MEC 115, and/or additional information stored by one or more memory units of the MEC 115.

The base station 120 can then provide the system information to one or more wireless devices, such as one of more of the vehicles 140. In an exemplary aspect, the base station 120 can provide the system information to the vehicles(s) 140 using, for example, one or more cellular technologies (e.g., LTE) and/or one or more other contention and/or non-contention based protocols. The base station 120 can provide the system information to the vehicle(s) 140 using a broadcasting and/or multicasting scheme in one or more aspects. For example, base station 120.1 provides the system information to vehicles 140.2 to 140.4 using a multicast deployment. In an exemplary aspect, the base station 120 can provide information (e.g., the system information) via one or more cellular technologies to one or more vehicles 140 that have limited or no V2X capabilities so that these vehicles can similarly utilize such information as advantageously done by V2X-capable vehicles.

In an exemplary aspect, the base station 120 is configured to wirelessly capture (e.g., listen, sniff) information from one or more vehicles 140 utilizing the uplink resources allocated for device-to-device (D2D) communications. For example, in LTE, the D2D signal is single-carrier frequency-division multiple access (SC-FDMA) signal that uses time-frequency resources of the uplink. In this example, the wirelessly captured information can use the resources reserved for the D2D communications.

Illustrated below is an example resource grid for an LTE uplink, with the time represented horizontally and the frequency represented vertically. In operation, certain resources are reserved for D2D communications. Because the base station 120 reserves these resources and communicates their position to the mobile devices 140, the base station 120 is aware of the timing and frequency of the D2D resources and can perform one or more capturing/sniffing operations to capture the information from the vehicle(s) 140 using the D2D resource allocations. Further, because the base station 120 can include one or more sectorized and/or focused antennas, the base station 120 can advantageously receive weaker V2X signals from vehicles 140.

| UE1 | | UE2 | UE2 | UE2 | | | | | |
|---|---|---|---|---|---|---|---|---|---|
| UE1 | | UE2 | UE2 | UE2 | | | | UE1 | |
| UE1 | D2D | | | | D2D | UE3 | | UE1 | D2D |
| UE2 | D2D | | | UE1 | D2D | UE2 | UE2 | UE1 | D2D |
| UE2 | D2D | UE3 | | UE1 | D2D | UE2 | UE2 | UE1 | D2D |
| UE2 | D2D | | | UE1 | D2D | UE2 | UE2 | UE3 | D2D |
| UE2 | | | | UE1 | | | | UE3 | UE2 |
| | | | | UE1 | | | | UE3 | UE2 |

In an exemplary aspect, the base station 120 is configured to control the transmission power of V2X technologies by the vehicle(s) 140. For example, the base station 120 can be configured to generate a control signal that is provided to one or more vehicles 140 (e.g., using one or more cellular technologies). The control signal can instruct the vehicle(s) 140 to adjust the transmission power at which the vehicle transmitted V2X communications. In an exemplary aspect, the base station 120 can instruct one or more vehicles 140 to increase the transmission power (e.g., from a default power) for V2X communications to increase the base station's 120 ability and/or likelihood to wireless capture information from the vehicles 140. For example, in less dense areas (rural areas), interference may be less (e.g., due to fewer vehicles). Therefore, an increase in transmission power for V2X communications can increase the facilitation of V2X communication where the vehicles 140 may be farther distances apart, as well as increase the likelihood that such communications can be captured by the base station 120. In an exemplary aspect, the base station 120 is configured to control the vehicle(s) 140 to selectively operate in a default transmission power mode where the vehicle transmits at a default transmission power level, and an adjusted transmission power mode where the vehicle transmits at an adjusted transmission power level (e.g., an increased or decreased power level relative to the default transmission power level). In some aspects, the vehicles 140 can be controlled to operate in three modes: a reduced transmission power mode, a default transmission power mode, and an increased transmission power mode.

Further, in an exemplary aspect, the transmission power levels can be adjusted based on the type of V2X communication that is being transmitted. For example, the base station 120 can control the vehicles to transmit at a first transmission power for general V2X communications (e.g., exchanging weather information, etc.) and a second transmission power for priority V2X communications (e.g., emergency communications or information, breaking indicator information, etc.), where the second transmission power is greater than the first transmission power. That is, the transmission power levels that are controlled by the base station 120 can be further divided into transmission power levels based on, for example, the classification or type of V2X communication. In an exemplary aspect, the vehicle(s) 140 can additionally or alternatively be configured to adjust the transmission power at which the vehicle transmits independent of the base station 120.

Figure 1B:
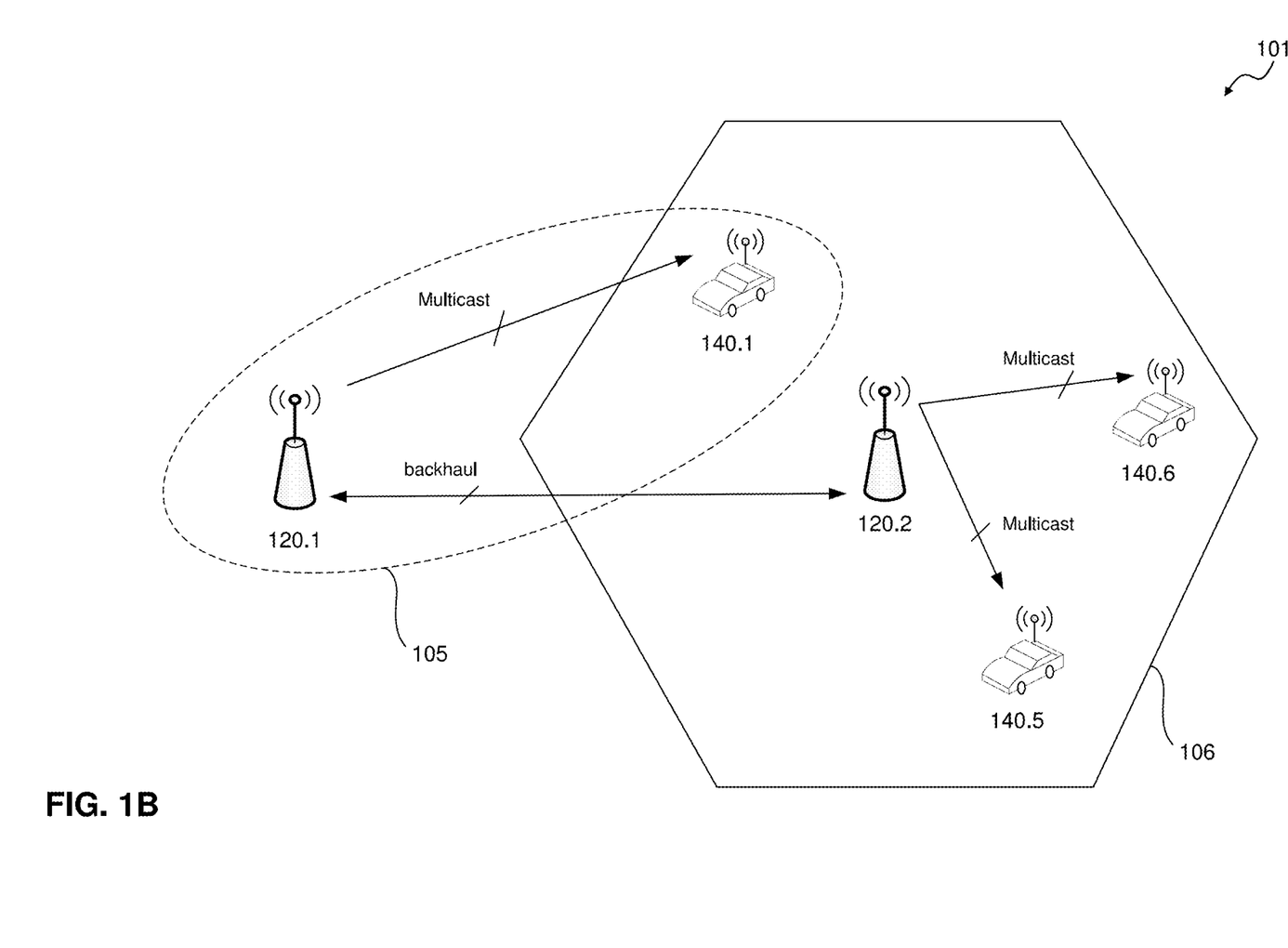
FIG. 1B illustrates a wireless communication system according to another exemplary aspects of the present disclosure.

Turning to FIG. 1B, in an exemplary aspect, the base station 120.1 can be configured to communicate with one or more other base stations 120.2 via a wired and/or wireless backhaul communication path. In operation, the base station 120.1 can communicate with one or more vehicles 140.1 within range of the base station 120.1 and in cell 105 that is also within range and in the corresponding cell 106 of the base station 120.2. In an exemplary aspect, captured and/or system information can be shared between the various base stations 120.1 and 120.2 via the backhaul communication path. For example, captured information from vehicles 104.1 and/or 140.2 in FIG. 1A, system information generated based on the processing of the captured information, and/or other system and/or captured information can be provided to the base station 120.2 via the backhaul communication path. The base station 120.2 can then be configured to provide the captured and/or system information associated with vehicles within cell 105 to one or more other vehicles within the cell 106, such as vehicles 140.5 and 140.6. In this example, the captured V2V information and/or system information associated with the vehicles 140.1 to 140.4 can be provided to the vehicles 140.5 and 140.6 that are out of range of the corresponding V2X communication technologies associated with vehicles 140.1 to 140.4, and vice versa. In this example, the base stations 120 function as range extenders that provide the captured information and/or system information to vehicles 140 that may be out-of-range of the localized V2X communications.

For example, vehicle 140.1 can provide vehicle 140.2 with information associated with the current traffic environment of vehicle 140.1. This information may be captured by the base station 120.1 and processed with additional information, such as additional traffic or other information (e.g., such as traffic information for a larger geographical area) and provide the processed traffic information to one or more of the vehicles 140.1 to 140.4 as system information. This system information and/or captured information can additionally or alternatively be provided to base station 120.2 via the backhaul communication path. Base station 120.2 can then provide the system information generated based on information from vehicles 140 of cell 105 to the vehicles of cell 106 supported by base station 120.2 (e.g., vehicles 140.5 and/or 140.6). In this example, the information obtained in the V2X environment of cell 105 can be provided to other devices (e.g., vehicles 140.3/140.4) outside the limited range of the V2X communications between vehicles 140.1 and 140.2, and/or to vehicles outside the range of the V2X communications and the cell 105 of base station 120.1 (e.g. vehicles within cell 106).

In an exemplary aspect, the captured information may include: information of the vehicle 140 transmitting the captured information; information of one or more other vehicles 140 that are currently communicating with the transmitting vehicle 140; information of one or more other vehicles 140 that have previously communicated with the transmitting vehicle 140; information of one or more other vehicles 140 that have been provided to the transmitting vehicle 140 from one or more current and/or previous vehicles communications; information from one or more objects (e.g., smart-grid components such as street lights, traffic lights, road sensors, road-side units, etc.) obtained by the transmitting vehicle 140 and/or by one or more other vehicles 140 that have provided the obtained information to the transmitting vehicle 140; and/or other information as would be understood by one of ordinary skill in the relevant arts.

In an exemplary aspect, the captured information may include operational information corresponding to one or more characteristics of the vehicles' operation—speed, acceleration, location and/or navigational (e.g., satellite) information, distance information between the corresponding vehicle 140 and one or more other objects (e.g., other vehicles 140, surrounding terrain, etc.); battery information; fuel information; tire air pressure; brake activation status; and/or other diagnostics information as would be understood by one of ordinary skill in the art; radio characteristics of one or more wireless communication systems implemented in the vehicle—Quality of Service (QoS) metrics (e.g., expected throughput, Packet Error Rate (PER), etc.), signal strength, communication technologies supported by the communication system(s) of the vehicle, and/or other radio characteristics as would be understood by one of ordinary skill in the art; environmental information (e.g., weather information); traffic information; road construction information; navigation information; enhanced position information; emergency services information—information associated with police, fire, and/or emergency medical services; and/or other information as would be understood by one of ordinary skill in the art.

In an exemplary aspect, the system information may include captured information from one or more vehicles, including the aggregation of information from two or more vehicles 140. The system information can also include additional information that supplements the captured information from one or more vehicles and/or other wireless devices within the communication system.

The system information can include the operational information of one or more vehicles 140, diagnostics information of one or more of the vehicles 140, radio characteristics of one or more vehicles 140, radio characteristics of one or more base stations 120 (e.g., 120.1, 120.2, etc.)—Quality of Service (QoS) metrics (e.g., expected throughput, Packet Error Rate (PER), etc.), signal strength, communication technologies supported by the base station(s) 120, coverage areas of the base station(s) 120, radio access technologies (RATs) supported by the base stations 120, identities of one or more base stations 120, locations of one or more base stations 120, suitability of specific RATs to low/medium/high-speed users, a-priori knowledge of radio characteristics, and/or other radio characteristics as would be understood by one of ordinary skill in the art; weather information of the geographical area served by the base station(s) 120 and/or other geographical areas; traffic information; road construction information; navigation information; enhanced position information; emergency services information—information associated with police, fire, and/or emergency medical services; density of users (e.g., vehicle density, traffic jam, average traffic, low traffic, etc.), occurrence of a special event (e.g., accident or maintenance work which will lead to a reduction of road capacity); and/or other information as would be understood by one of ordinary skill in the art.

Figure 2:
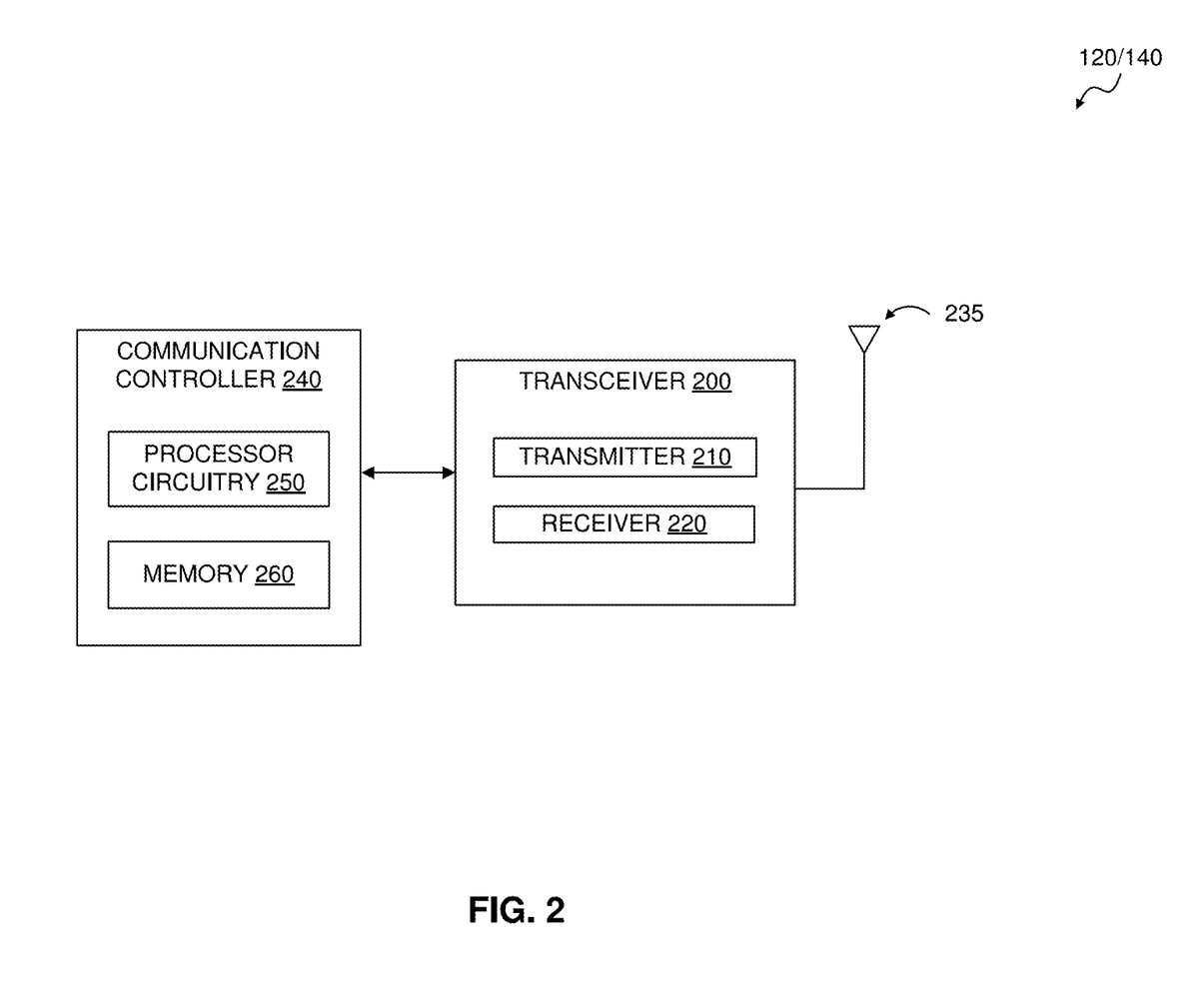
FIG. 2 illustrates a wireless device according to an exemplary aspect of the present disclosure.

FIG. 2 illustrates exemplary aspects of the base station 120 and/or communication device 140. Base station 120 and/or the communication device 140 can include a communication controller 240 communicatively coupled to one or more transceivers 200. The transceiver(s) 200 can be configured to transmit and/or receive wireless communications via one or more wireless technologies, such as one or more V2X technologies (e.g., WAVE, 5.9 GHz), one or more cellular technologies (e.g., LTE, one or more 5G technologies), and/or one or more other contention and/or non-contention based protocols.

The transceiver 200 can include processor circuitry that is configured for transmitting and/or receiving wireless communications conforming to one or more wireless technologies. For example, the transceiver 200 can include a transmitter 210 and a receiver 220 configured for transmitting and receiving wireless communications, respectively, via one or more antennas 235.

The transceiver 200 can determine radio characteristics such as, for example, wireless channel information, the radio access technologies (RATs) being used, parameters and/or characteristics of the RATs, the modulation and coding scheme, and/or one or more other characteristics and/or parameters as would be understood by those skilled in the art. The radio characteristics can then be provided to the controller 240 to be used for one or more functions of the controller 240.

In exemplary aspects, the transceiver 200 can include (but is not limited to) a digital signal processer (DSP), modulator and/or demodulator, a digital-to-analog converter (DAC) and/or an analog-to-digital converter (ADC), an encoder/decoder (e.g., encoders/decoders having convolution, tail-biting convolution, turbo, Viterbi, and/or Low Density Parity Check (LDPC) encoder/decoder functionality), a frequency converter (including mixers, local oscillators, and filters), Fast-Fourier Transform (FFT), precoder, and/or constellation mapper/de-mapper that can be utilized in transmitting and/or receiving of wireless communications. In one or more aspects, the transmitter 210 and/or receiver 220 can include one or more of these components. Further, those skilled in the relevant art(s) will recognize that antenna 235 may include an integer array of antennas, and that the antennas may be capable of both transmitting and receiving wireless communication signals.

The communication controller 240 can include processor circuitry 250 that is configured to control the overall operation of the device (e.g., communication device 140 or base station 120), such as the operation of the transceiver 200. The processor circuitry 250 can be configured to, for example, control the transmitting and/or receiving of wireless communications via the transceiver 200 and/or perform (and/or control the transceiver 220 to perform) one or more baseband processing functions (e.g., radio frequency (RF) to baseband conversion, media access control (MAC), encoding/decoding, modulation/demodulation, data symbol mapping; error correction, etc.). The processor circuitry 250 can be configured to run one or more applications and/or operating systems; power management (e.g., battery control and monitoring); display settings; volume control; and/or user interactions via one or more user interfaces (e.g., keyboard, touchscreen display, microphone, speaker, etc.).

The communication controller 240 can further include a memory 260 that stores data and/or instructions, where when the instructions are executed by the processor circuitry 250, controls the processor circuitry 250 to perform the functions described herein. The memory 260 can store captured and/or system information as described herein. The memory 260 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 260 can be non-removable, removable, or a combination of both.

Turning to aspects of the base station 120, the communication controller 240 can be configured to control the transceiver 200 to wirelessly capture (e.g., listen, sniff) information that is wirelessly transmitted by the vehicle(s) 140 using one or more wireless communication technologies, such as one or more V2X technologies, but is not limited thereto. For example, as shown in FIG. 1A, the base station 120.1 can capture the information exchanged between the vehicles 140.1 and 140.2 via the V2V communication path using one or more V2X technologies.

With reference to FIG. 1A, the communication controller 240 of the base station 120 can be configured to perform one or more sniffing/capture operations to sniff/capture the information or a portion of the information transmitted by one or more vehicles 140, such as information transmitted by the vehicle 140.1 to the vehicle 140.2, and vice versa, using one or more V2X technologies.

In an exemplary aspect, the communication controller 240 is configured process the captured information to generate system information, which can be distributed to one or more vehicles 140 and/or devices. For example, the communication controller 240 can be configured to aggregate information captured from multiple vehicles 140 to generate the system information. In an exemplary aspect, the communication controller 240 can control the base station 120 to obtain additional information from one or more external sources (e.g., network 111) and generate the system information based on the external information and/or the captured information from one or more vehicles 140 and/or other devices.

In an exemplary aspect, the communication controller 240 can control the base station 120 to cooperatively process the captured information and/or the additional external information with the MEC 115. For example, the base station 120.1 and the MEC 115 can cooperatively process the captured information to generate system information. In an exemplary aspect, the processing can include obtaining additional information from one or more external sources and combining a portion or all of the external information with the captured information to generate the system information. In an exemplary aspect, the controller 240 can request (or control the MEC 115 to provide) the external information from the MEC 115. For example, the external information can be obtained by the MEC 115 from one or more components of or connected to the network 111 via the backhaul connection between the network 111. The obtained information and/or additional information stored by one or more memory units of the MEC 115 can be provided to the communication controller 240 for use and/or further processing.

In an exemplary aspect, the communication controller 240 is configured to provide (and/or control the base station 120 to provide) the system information to one or more wireless devices, such as one of more of the vehicles 140. In an exemplary aspect, the controller 240 provides the system information via the transceiver 200 using, for example, one or more cellular technologies (e.g., LTE) and/or one or more other contention and/or non-contention based protocols, but is not limited thereto. As shown in FIG. 1A, the base station 120 can provide the system information to the vehicle(s) 140 using a broadcasting and/or multicasting scheme in one or more aspects.

Figure 3:
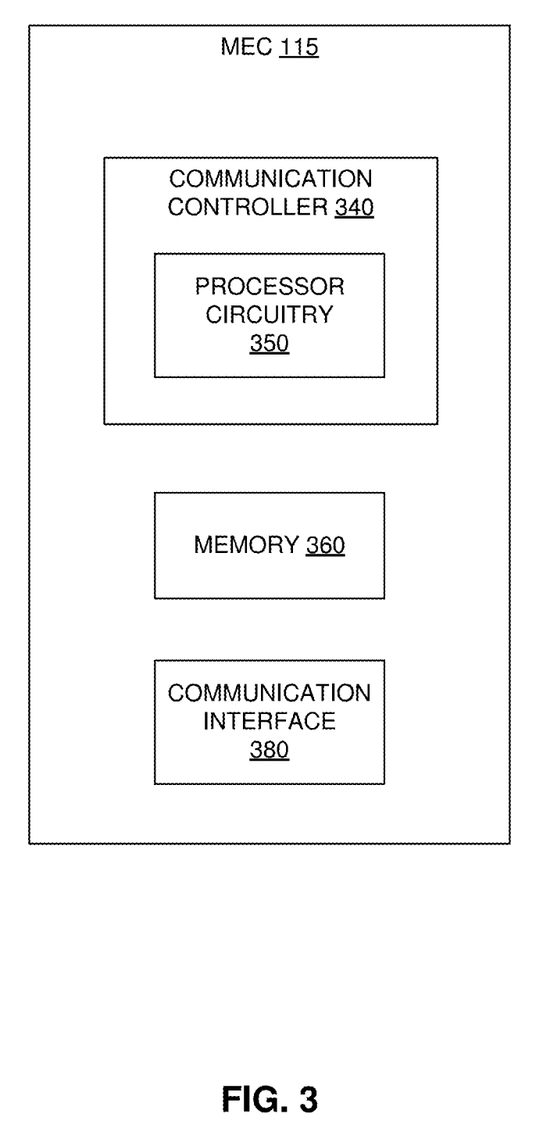
FIG. 3 illustrates a mobile edge computer (MEC) according to an exemplary aspect of the present disclosure.

FIG. 3 illustrates the mobile edge computer (MEC) according to an exemplary aspect of the present disclosure. The MEC 115 can include a communication controller 340 (having processor circuitry 350), memory 360, and communication interface 380. In one or more aspects, the communication controller 340 can include a memory 360 in addition to, or alternatively to, the memory 360 of the MEC 115.

In an exemplary aspect, the MEC 115 is deployed along with one or more base stations 120 to provide, for example, one or more computing (e.g., cloud) capabilities in close proximity to the wireless communication network (e.g., at the edge of wireless communication network). In an exemplary aspect, the communication interface 380 is configured to facilitate the communicative coupling of the MEC 115 to the one or more base stations 120 and/or to network 111. In some aspects, the MEC 115 is implemented within the base station 120 and the communication interface 380 facilitates the coupling to one or more components of the base station 120 (e.g., controller 240).

In an exemplary aspect, the MEC 115 is configured to run one or more applications and perform one or more related processing operations and/or tasks in proximity to the base station 120 and corresponding wireless communication network to reduce network congestion and improve the performance of the wireless communication network. The MEC 115 can also be configure to allow the wireless communication network to one or more authorized third-parties (e.g., application developers and/or content providers).

In an exemplary aspect, the communication controller 340 (e.g., the processor circuitry 350) of the MEC 115 is configured to control the overall operation of the MEC 115, including processing captured information provided from the base station 120 and/or additional information obtained from one or more external sources (e.g., via the network).

The communication controller 340 (e.g., processor circuitry 350) can be configured to obtain (or control the MEC 115 to obtain) additional information from one or more external sources (e.g., from the network 111) and process the additional information to generate system information which can be distributed to one or more vehicles 140 by the base station 120.

The communication controller 340 (e.g., processor circuitry 350) can be configured to process the additional information, captured information from the base station 120, or a combination of both the additional information and the captured information to generate the system information that is ultimately provided to one or more vehicles 140 by the base station 120. For example, the MEC 115 can be configured to obtain traffic information from the network 111 (e.g., from one or more traffic data providers) and/or from stored traffic information that is stored in memory 360, and process the traffic information along with captured information from the base station 120 to generate the system information. In this example, the MEC 115 can combine the traffic information with the captured information, which may include vehicle traffic information provided from one or more vehicles 140, to generate a more advanced set of traffic information (e.g. more detailed traffic information for a larger geographical area) that is provided to the vehicles 140 as system information.

In an exemplary aspect, the processing by the MEC 115 (or cooperatively by the base station 120 and the MEC 115) can include obtaining additional information from one or more external sources and/or internal and/or external memory units, and combining a portion or all of the additional information with a portion or all captured information to generate the system information. For example, the additional information can be obtained by the MEC 115 from one or more components of or connected to the network 111 via the backhaul connection between the network 111 and the MEC 115, and/or additional information stored by one or more memory units of the MEC 115 and/or external memory units coupled to the MEC 115.

The memory 360 stores data and/or instructions, where when the instructions are executed by the processor circuitry 350, controls the processor circuitry 350 to perform the functions described herein. The memory 360 can store the additional information obtained by the MEC 115 from one or more external sources and/or additional information that is stored on the MEC 115, captured information received from one or more vehicles 140, and/or system information generated by the MEC and/or the base station 120. The memory 360 can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory 360 can be non-removable, removable, or a combination of both.

The communication interface 380 can include processor circuitry that is configured to communicatively couple the MEC 115 to one or more base stations 120 and/or the network 111. In some aspects, the communication interface 380 couples the MEC 115 to one or more other MECs 115.

Figure 4:
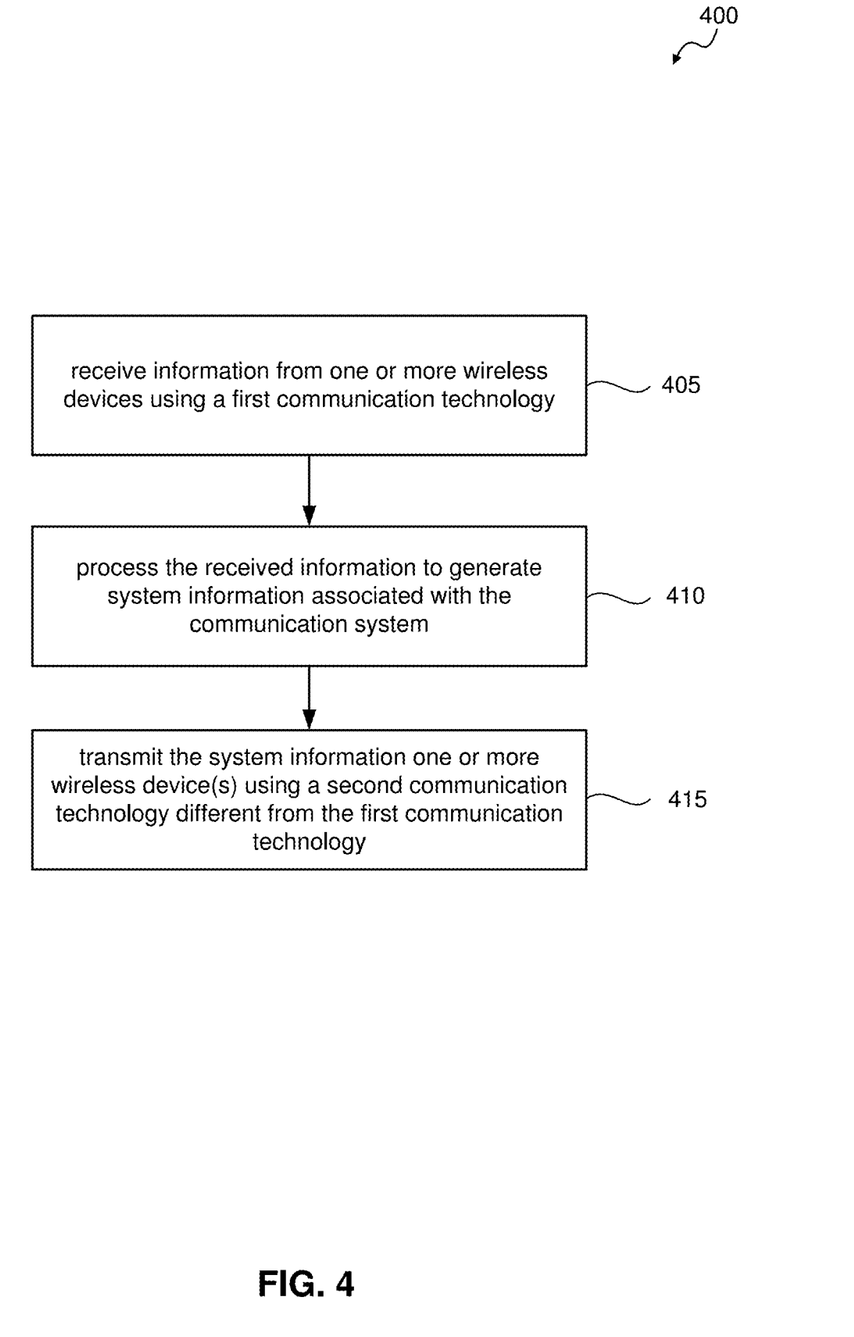
FIG. 4 illustrates a flowchart of a method of performing wireless communication by a wireless communication device according to an exemplary aspect of the present disclosure.

FIG. 4 illustrates a flowchart 400 of a method of performing wireless communication by a wireless communication device according to an exemplary aspect of the present disclosure. The flowchart is described with continued reference to FIGS. 1A-3. The operations of the method are not limited to the order described below, and the various operations may be performed in a different order. Further, two or more operations of the method may be performed simultaneously with each other.

The method of flowchart 400 begins at operation 405, where information is received from one or more wireless devices (e.g., vehicles 140) using a first communication technology. For example, the base station 120 can receive captured information from one or more vehicles 140 using one or more V2X technologies.

After operation 405, the flowchart 400 transitions to operation 410, where the received information is processed to generate system information associated with the communication system. For example, the controller 240 of the base station 120 can process the captured data to generate system data. The processing can include combining the captured data with additional data received from one or more external sources (e.g., by the MEC 115).

After operation 410, the flowchart 400 transitions to operation 415, where the system information is transmitted to one or more wireless device using a second communication technology different from the first communication technology. For example, the base station 120 can transmit (e.g., multicast) the system information to one or more vehicles 140 using, for example, LTE.

Again, while aspects of the present disclosure are described with respect to V2X (and particularly V2V) technology, it is understood that the disclosure is not limited in this respect. The concepts described herein may be applicable to technologies such as, for example (but not limited to), 3rd Generation Partnership Project (3GPP) Long Term Evolution (LTE), 5th Generation (5G) wireless systems, Bluetooth, Wi-Fi, Vehicle-to-Everything (V2X), Vehicle-to-Infrastructure (V2I), Vehicle-to-Vehicle (V2V), Vehicle-to-Device (V2D), Multefire, Cellular Broadband Radio Service (CBRS), ZigBee, Z-Wave, Narrow Band Internet-of-Things (NB-IoT), etc.

The concepts described herein may also be applicable in other environments and uses. For example, the concepts may be applied in (but not limited to): enterprise settings, such as D2D communications between wireless devices in an office that are captured by one or more wireless access points and processed and distributed as described herein; industrial settings, such as robot-to-robot communications that are captured by one or more wireless access points and processed and distributed; aviation settings, such as plane-to-plane or drone-to-drone communications that are captured by one or more wireless access points and processed and distributed; smart building settings (e.g., smart-home systems), such as D2D communications of IoT devices and/or wireless devices that are captured by one or more wireless access points and processed and distributed to wireless devices and/or other smart building networks (e.g., from a first home/apartment to a second home/apartment); mobile device (e.g. smartphone) to mobile device communications that are captured by one or more wireless access points and processed and distributed; and to technologies having both contention and non-contention based protocols, such as 5G and Wi-Fi.

EXAMPLES

Example 1 is a communication device adapted for communicating in a communication system, the communication device comprising: a receiver configured to receive information from one or more wireless devices using a first communication technology; a communication controller configured to: process the received information captured from a communication between the one or more wireless devices and one or more other wireless devices using the first communication technology; and generate system information associated with the communication system based on the processed information captured from the communication; and a transmitter configured to transmit the system information to at least one of the one or more wireless devices or the one or more other wireless devices using a second communication technology different from the first communication technology.

In Example 2, the subject matter of Example 1, wherein the communication controller is further configured to obtain additional information from one or more external sources and to combine the additional information with the received information to generate the system information.

In Example 3, the subject matter of any of Examples 1-2, wherein the first communication technology is a vehicle-to-everything communication technology (V2X).

In Example 4, the subject matter of Example 3, wherein the V2X operates on about a 5.9 GHz frequency band.

In Example 5, the subject matter of Example 1, wherein the second communication technology is a cellular communication technology.

In Example 6, the subject matter of Example 5, wherein the second communication technology is a 3rd Generation Partnership Project (3GPP) communication technology.

In Example 7, the subject matter of Example 1, wherein the first communication technology is a vehicle-to-everything communication technology (V2X) and the second communication technology is a cellular communication technology.

In Example 8, the subject matter of Example 1, wherein the first communication technology is a vehicle-to-everything communication technology (V2X) and the second communication technology is a 5th Generation (5G) communication technology.

In Example 9, the subject matter of Example 1, wherein the received information comprises: information transmitted from the one or more wireless devices to the one or more other wireless device via a device-to-device communication.

In Example 10, the subject matter of Example 9, wherein the information transmitted from the one or more wireless devices comprises operational information of the one or more wireless devices.

In Example 11, the subject matter of Example 9, wherein the receiver is configured to capture the information transmitted from the one or more wireless devices to the one or more other wireless devices to obtain the received information.

In Example 12, the subject matter of Example 10, wherein the operational information comprises: a speed at which the one or more wireless devices is traveling; a change in the speed at which the one or more wireless devices is traveling; location positioning data of the one or more wireless devices; or distance information from the one or more wireless devices to the one or more other wireless devices.

In Example 13, the subject matter of any of any of Examples 1-2 and 5-12, wherein the system information comprises: operational information of the one or more wireless devices; environmental data corresponding to the communication system; or quality of service information of the communication system.

In Example 14, the subject matter of Example 13, wherein the environmental data comprises: vehicular traffic information of a geographical area supported by the communication system; navigation information of the geographical area supported by the communication system; navigation information of the one or more wireless devices and one or more other wireless devices within the communication system; weather information; or emergency information associated with: at least one wireless device located within the communication system or the geographical area supported by the communication system.

In Example 15, the subject matter of any of Examples 1-2 and 5-12, wherein the communication device is a base station and the one or more wireless devices are comprised in one or more corresponding vehicles.

In Example 16, the subject matter of Example 15, wherein the first communication technology is a vehicle-to-everything communication technology (V2X) and the second communication technology is a cellular communication technology.

In Example 17, the subject matter of Example 15, wherein the transmitter is further configured to transmit the system information to another base station.

In Example 18, the subject matter of Example 1, wherein the one or more wireless devices is comprised within one or more corresponding vehicles.

In Example 19, the subject matter of Example 1, wherein the transmitter is configured to forward the system information to the one or more wireless devices using a broadcasting or multicasting scheme using one or more 5th Generation (5G) communication technologies.

Example 20 is a method for performing wireless communication by a wireless device in a communication system, the method comprising: receiving information from one or more wireless devices using a first communication technology; processing the received information captured from a communication between the one or more wireless devices and one or more other wireless devices using the first communication technology; generating system information associated with the communication system based on the processed information captured from the communication; and transmitting the system information to at least one of the one or more wireless devices or the one or more other wireless devices using a second communication technology different from the first communication technology.

In Example 21, the subject matter of Example 20, further comprising: obtaining additional information from one or more external resources; and combining the additional information with the received information, wherein the generating the system information is further based on the additional information.

In Example 22, the subject matter of any of Examples 20-21, wherein the first communication technology is a vehicle-to-everything communication technology (V2X) and the second communication technology is a cellular communication technology.

In Example 23, the subject matter of any of Examples 20-21, wherein the first communication technology is a vehicle-to-everything communication technology (V2X) and the second communication technology is a 5th Generation (5G) communication technology.

Example 24 is a communication system comprising: a base station comprising: a receiver configured to capture a wireless communication from a vehicle to one or more wireless devices using a vehicle-to-everything communication technology (V2X); and a transmitter configured to transmit the system information to one or more other wireless devices using a cellular communication technology; and a processor communicatively coupled to the base station, the processer being configured to process the sniffed communication to generate the system information.

In Example 25, the subject matter of Example 24, wherein the processor is further configured to obtain additional information from one or more external resources and to combine the additional information with the sniffed information to generate the system information.

Example 26 is an apparatus comprising means to perform the method as claimed in any of claims 20-23.

Example 27 is a computer program product embodied on a computer-readable medium comprising program instructions, when executed, causes a processor to perform the method of any of claims 20-23.

Example 28 is an apparatus substantially as shown and described.

Example 29 is a method substantially as shown and described.

Conclusion

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processor circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

Any of the radio links may operate according to any one or more of the following radio communication technologies and/or standards including, but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee (e.g., IEEE 802.15.4), Bluetooth®, Worldwide Interoperability for Microwave Access (WiMAX).

Wireless Gigabit Alliance (WiGig) standard, mmWave standards in general (wireless systems operating at 10-300 GHz and above such as WiGig, IEEE 802.11ad, IEEE 802.1 lay, etc.), technologies operating above 300 GHz and THz bands, (3GPP/LTE based or IEEE 802.11p and other) Vehicle-to-Vehicle (V2V) and Vehicle-to-Everything (V2X) and Vehicle-to-Infrastructure (V2I), Infrastructure-to-Vehicle (I2V), Vehicle-to-Device (V2D) communication technologies, 3GPP cellular V2X, IEEE 802.11p based, DSRC (Dedicated Short Range Communications) communication systems such as Intelligent-Transport-Systems and others, etc.

The concepts can also be used in the context of any spectrum management scheme including dedicated licensed spectrum, unlicensed spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System in 3.55-3.7 GHz and further frequencies). Applicable spectrum bands include IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc.). Note that some bands are limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Furthermore, a hierarchical application of the scheme is possible, for example, by introducing a hierarchical prioritization of usage for different types of wireless devices (e.g., low/medium/high priority, etc.), based on a prioritized access to the spectrum, for example, with highest priority to tier-1 wireless devices, followed by tier-2, then tier-3, etc. wireless devices, etc.

The concepts can also be applied to different Single Carrier or OFDM varieties, such as CP-OFDM, SC-FDMA, SC-OFDM, filter bank-based multicarrier (FBMC), OFDMA, etc., and in particular 3GPP NR (New Radio) by allocating the OFDM carrier data bit vectors to the corresponding symbol resources.

The concepts described herein may also be applicable in enterprise settings, industrial settings (e.g., robot-to-robot), aviation (e.g., plane-to-plane, drone-to-drone) and to technologies having both contention and non-contention based protocols, such as 5G and Wi-Fi.

What is claimed is:

1. A communication device adapted for communicating in a communication system, the communication device comprising:
   a receiver configured to receive information from one or more wireless devices using a first communication technology;
   a communication controller configured to:
   process the received information captured from communications between the one or more wireless devices using the first communication technology, the received information being indicative of vehicle traffic information provided by the one or more wireless devices;
   generate system information associated with the communication system, the system information being generated based on a combination of (i) traffic information received via one or more network components separate from and external to the communication device and the one or more wireless devices, and (ii) the processed information captured from the communications between the one or more wireless devices; and a transmitter configured to transmit (i) the system information and (ii) a control signal to at least one of the one or more wireless devices using a second communication technology different from the first communication technology, wherein the system information is indicative of vehicle traffic information for a geographical area that encompasses the one or more wireless devices, wherein the control signal comprises instructions for at least one of the one or more wireless devices to adjust a transmission power associated with communications using the first communication technology, and wherein the transmission power adjustment is based upon the communications between the one or more wireless devices.

2. The communication device of claim 1, wherein the first communication technology is a vehicle-to-everything communication technology (V2X).

3. The communication device of claim 2, wherein the V2X operates on about a 5.9 GHz frequency band.

4. The communication device of claim 1, wherein the second communication technology is a cellular communication technology.

5. The communication device of claim 4, wherein the second communication technology is a 3rd Generation Partnership Project (3GPP) communication technology.

6. The communication device of claim 1, wherein the first communication technology is a vehicle-to-everything communication technology (V2X) and the second communication technology is a cellular communication technology.

7. The communication device of claim 1, wherein the first communication technology is a vehicle-to-everything communication technology (V2X) and the second communication technology is a 5th Generation (5G) communication technology.

8. The communication device of claim 1, wherein the received information comprises:
information transmitted from one or more of the wireless devices to another one or more of the wireless devices via a device-to-device communication.

9. The communication device of claim 8, wherein the information transmitted from the one or more of the wireless devices comprises operational information of the one or more wireless devices.

10. The communication device of claim 9, wherein the operational information comprises:
a speed at which the one or more wireless devices is traveling;
a change in the speed at which the one or more wireless devices is traveling;
location positioning data of the one or more wireless devices; or
distance information from one or more of the wireless devices to another one or more of the wireless devices.

11. The communication device of claim 8, wherein the receiver is configured to capture the information transmitted from at least one of the one or more wireless devices to at least another one of the one or more wireless devices to obtain the received information.

12. The communication device of claim 1, wherein the system information comprises:
operational information of the one or more wireless devices;
environmental data corresponding to the communication system; or
quality of service information of the communication system.

13. The communication device of claim 12, wherein the environmental data comprises:
navigation information of the geographical area supported by the communication system;
navigation information of the one or more wireless devices within the communication system;
weather information; or
emergency information associated with at least one of the one or more wireless devices.

14. The communication device of claim 1, wherein the communication device comprises a base station.

15. The communication device of claim 14, wherein the first communication technology is a vehicle-to-everything communication technology (V2X) and the second communication technology is a cellular communication technology.

16. The communication device of claim 14, wherein the transmitter is further configured to transmit the system information to another base station.

17. The communication device of claim 1, wherein each one of the one or more wireless devices is comprised within a respective vehicle.

18. The communication device of claim 1, wherein the transmitter is configured to forward the system information to the one or more wireless devices using a broadcasting or multicasting scheme in accordance with one or more 5th Generation (5G) communication technologies.

19. The communication device of claim 1, wherein the instructions for at least one of the one or more wireless devices to adjust the transmission power comprise instructions to set the transmission power in accordance with one of a plurality of different transmission power modes with different respective transmission power levels.

20. The communication device of claim 19, wherein the plurality of different transmission power modes are associated with different respective classifications of communication between the one or more wireless devices that are identified from the received information captured from the communication between the one or more wireless devices.

21. The communication device of claim 1, wherein at least one of the one or more wireless devices to which the system information is transmitted is out of range of the other one or more wireless devices with respect to communications in accordance with the first communication technology.

22. The communication device of claim 1, wherein the one or more network components comprise a mobile edge computer (MEC).

23. The communication device of claim 1, wherein the receiver is configured to receive information from one or more wireless devices during a time period defined by a device-to-device (D2D) resource allocation in accordance with the second communication technology.

24. A method for performing wireless communication by a wireless device in a communication system, the method comprising:
receiving information from one or more wireless devices using a first communication technology;
processing the received information captured from communications between the one or more wireless devices using the first communication technology, the received information being indicative of vehicle traffic information provided by the one or more wireless devices;
generating system information associated with the communication system, the system information being generated based on a combination of (i) traffic information received via one or more network components separate from and external to the communication device and the one or more wireless devices, and (ii) the processed information captured from the communications between the one or more wireless devices; and transmitting (i) the system information and (ii) a control signal to at least one of the one or more wireless devices using a second communication technology different from the first communication technology, wherein the system information is indicative of vehicle traffic information for a geographical area that encompasses the one or more wireless devices, wherein the control signal comprises instructions for at least one of the one or more wireless devices to adjust a transmission power associated with communications using the first communication technology, and wherein the transmission power adjustment is based upon the communications between the one or more wireless devices.

25. The method of claim 24, wherein the first communication technology is a vehicle-to-everything communication technology (V2X) and the second communication technology is a cellular communication technology.

26. The method of claim 24, wherein the first communication technology is a vehicle-to-everything communication technology (V2X) and the second communication technology is a 5th Generation (5G) communication technology.

27. A communication system comprising:

a base station comprising:
- a receiver configured to sniff a wireless communications between one or more wireless devices in accordance with a vehicle-to-everything (V2X) communication technology; and
- a transmitter configured to transmit (i) system information, and (ii) a control signal to the one or more wireless devices using a cellular communication technology; and
- a processor communicatively coupled to the base station, the processor being configured to process the sniffed communications that are indicative of vehicle traffic information provided by the one or more wireless devices, and to generate the system information based on a combination of (i) traffic information received via one or more network components separate from and external to the base station and the one or more wireless devices, and (ii) the processed sniffed communications between the one or more wireless devices, wherein the system information is indicative of vehicle traffic information for a geographical area that encompasses the one or more wireless devices, wherein the control signal comprises instructions for at least one of the one or more wireless devices to adjust a transmission power associated with communications using the V2X communication technology, and wherein the transmission power adjustment is based upon the sniffed communications between the one or more wireless devices.

\* \* \* \* \*